(12) United States Patent
Kizaki et al.

(10) Patent No.: US 6,605,360 B2
(45) Date of Patent: Aug. 12, 2003

(54) POLYORGANOSILOXANE COMPOUND AND COATING COMPOSITION CONTAINING THE SAME

(75) Inventors: Hiroaki Kizaki, Annaka (JP); Masaaki Yamaya, Takasaki (JP); Akinari Itagaki, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/951,741

(22) Filed: Sep. 14, 2001

(65) Prior Publication Data

US 2002/0055601 A1 May 9, 2002

(30) Foreign Application Priority Data

Sep. 14, 2000 (JP) ......................................... 2000-280741

(51) Int. Cl.$^7$ ............................................... C08G 77/08
(52) U.S. Cl. ........................... 428/447; 528/15; 528/14; 528/18; 528/17; 528/21; 528/31; 528/32
(58) Field of Search ............................... 528/15, 31, 32, 528/21, 14, 17, 18; 428/447

(56) References Cited

U.S. PATENT DOCUMENTS

| | | | | |
|---|---|---|---|---|
| 4,310,678 A | * | 1/1982 | Blizzard et al. | ............. 556/451 |
| 4,595,610 A | * | 6/1986 | Fey et al. | ................. 428/319.3 |
| 5,270,110 A | * | 12/1993 | Murakami et al. | ............ 428/355 |

* cited by examiner

*Primary Examiner*—Margaret G. Moore
(74) *Attorney, Agent, or Firm*—Oblon, Spivak, McClelland, Maier & Neustadt, P.C.

(57) ABSTRACT

A polyorganosiloxane compound obtained by allowing a polyorganosiloxane having silicone resin structure to react with a polyorganosiloxane having silicone oil structure in the presence of a hydrosilylation catalyst, and having the both structures in the molecule. Also disclosed is a coating composition including the polyorganosiloxane compound, a silane or silicone resin having an RO—Si group, and a curing catalyst. The former polyorganosiloxane compound is compatible with silicone resins. The latter coating composition can provide coatings improved in flexibility without lowering the curability, surface hardness and weatherability inherent in silicone resins.

13 Claims, No Drawings

POLYORGANOSILOXANE COMPOUND AND COATING COMPOSITION CONTAINING THE SAME

BACKGROUND OF THE INVENTION

1. Field of the Invention

This invention relates to a polyorganosiloxane compound characterized by containing in the molecule both a silicone oil chain structure and a silicone resin structure having an alkoxyl group and/or a silanol group, and also relates to a coating composition making use of this compound. More particularly, this invention relates to a novel polyorganosiloxane compound which is compatible with silicone resins, and a coating composition making use of this compound.

2. Description of the Prior Art

Nowadays, silicone resins are widely used in various fields because of their superior properties in respect of water repellency, heat resistance, weatherability, freeze resistance, electrical insulation properties, chemical resistance and safety to the human body.

Among them, silicone resins having a three-dimensional cross-linked structure composed chiefly of $SiO_2$ units (Q units) and $RSiO_{1.5}$ units (T units; R is an organic group such as an alkyl group or a phenyl group) are widely used in coating materials and binders, using their curability. In particular, a liquid substance having an Si—OR group as a cross-linking group is, as disclosed in Japanese Patent No. 2137192, utilized as a chief ingredient of a solvent-free type coating material which is combustible and does not contain any organic solvent harmful to the human body. Also, there is an advantage that this Si—OR group is not required to be heated to cure because of its cross-linking reaction which proceeds by moisture in air and at room temperature and hence any coating materials making use of this substance as a chief ingredient can be applied in situ.

Such a Si—OR type silicone resin has strong points of good curability and high surface hardness because of its three-dimensional cross-linked structure. It, however, affords an insufficient flexibility to cause cracks in coating films in some cases. In order to improve this flexibility, a method has been employed in which diorganosiloxane ($R_2SiO$) units (D units) are incorporated when the silicone resin is synthesized. In this case, however, the D units are incorporated in the structure at random, and hence there is a problem that, the D units must be added in a large quantity in order to impart the flexibility, so that the superior curability and surface hardness, the strong points of this silicone resin, may lower.

In addition, the D units are added to the silicone resin in the form of chain structure. Hence, in an attempt to add a silicone oil comprised of chain structure of D units, its addition may cause milkiness or repellency of coating films because of a poor compatibility of the silicone oil with the silicone resin. Thus, it can not be added as what is expected of itself.

A method of adding a silicone oil terminated with TEOS ($Si(OEt)_4$) at both terminals of the molecular chain is also proposed (Polymeric Materials Science and Engineering, 1998, Vol.79, 192). In this case, too, its compatibility with silicone resins is not improved, and its addition causes milkiness or repellency of coating films.

It is also possible to improve the flexibility by adding to the silicone resin a resin other than silicone, such as acrylic resin or epoxy resin. However, these resins commonly have weatherability and so forth which are inferior to those of silicone, so that the resultant coating material has low weatherability and so forth.

SUMMARY OF THE INVENTION

Accordingly, an object of the present invention is to provide a polyorganosiloxane compound having a specific structure, which is compatible with silicone resins.

Another object of the present invention is to provide a coating composition which utilizes this polyorganosiloxane compound and can obtain coatings improved in flexibility without lowering the properties inherent in silicone resins, such as curability, surface hardness and weatherability.

In order to achieve the above objects, the present inventors have made extensive studies and have accomplished the present invention.

More specifically, firstly, the present invention provides a polyorganosiloxane compound which contains in the molecule a silicone oil structure and a silicone resin structure having at least one of an alkoxyl group and a silanol group and is compatible with a silicone resin:

The compound is obtained by allowing the following polyorganosiloxane (a1) to react with the following polyorganosiloxane (a2) in the presence of a hydrosilylation catalyst.

(a1) A polyorganosiloxane represented by the average compositional formula (1):

$$R^1_a R^2_b Si(OR^3)_c O_{(4-a-b-c)/2} \quad (1)$$

wherein $R^1$ is at least one group selected from the group consisting of a substituted or unsubstituted alkyl group and a substituted or unsubstituted aryl group; $R^2$ is a group containing an aliphatic unsaturated double bond; $R^3$ is at least one member selected from the group consisting of a hydrogen atom and an alkyl group having 1 to 4 carbon atoms which may have an ether linkage; and a, b and c are numbers that satisfy the following relation: $0 \leq a < 1.5$, $0.01 \leq b \leq 1$, $0.5 \leq a+b \leq 1.8$, $0.01 \leq c \leq 2.5$ and $1 \leq a+b+c \leq 3$; and having at least one aliphatic unsaturated double bond in the molecule.

(a2) A polyorganosiloxane represented by the general formula (2):

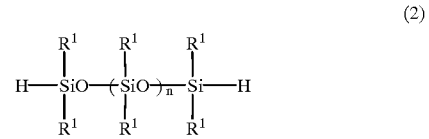

wherein $R^1$ is as defined in respect of the above formula (1), and n is a number of from 0 to 1,000.

Secondly, the present invention provides a coating composition comprising:

(α) from 0.1 part by weight to 100 parts by weight of the polyorganosiloxane compound described above;

(β) from 99.9 parts by weight to 0 part by weight of a silane compound and/or silicone resin containing an $R^3O$—Si group where $R^3$ is as defined above;

provided that the total of components (α) and (β) comes to 100 parts by weight; and (γ) from 0.01 part by weight to 50 parts by weight of a curing catalyst, based on 100 parts by weight of the total of the components (α) and (β).

DESCRIPTION OF THE PREFERRED EMBODIMENTS

The present invention is described below in detail.

Polyorganosiloxane Compound

The polyorganosiloxane compound of the present invention which contains in the molecule a silicone oil structure (straight-chain siloxane structure) and a silicone resin structure (branched siloxane structure) having at least one of an alkoxyl group and a silanol group and is compatible with a silicone resin (comprised of a branched siloxane structure). This polyorganosiloxane compound may be produced by a process including, but not particularly limited to, the following two processes.

The first process utilizes the reaction of hydrosilylation of Si—H groups to aliphatic unsaturated double bonds, and comprises allowing a polyorganosiloxane (a1) represented by the following average compositional formula (1), with a polyorganosiloxane (a2) represented by the following general formula (2).

$$R^1{}_a R^2{}_b Si(OR^3)_c O_{(4-a-b-c)/2} \quad (1)$$

wherein $R^1$ is at least one group selected from the group consisting of a substituted or unsubstituted alkyl group and a substituted or unsubstituted aryl group; $R^2$ is a group containing an aliphatic unsaturated double bond; $R^3$ is at least one member selected from the group consisting of a hydrogen atom and an alkyl group having 1 to 4 carbon atoms which may have an ether linkage; and a, b and c are numbers that satisfy the following relation: $0 \leq a < 1.5$, $0.01 \leq b \leq 1$, $0.5 \leq a+b \leq 1.8$, $0.01 \leq c \leq 2.5$ and $1 \leq a+b+c \leq 3$; and having at least one aliphatic unsaturated double bond in the molecule.

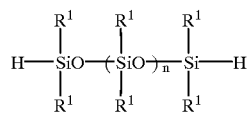

(2)

wherein $R^1$ is as defined in respect of the above formula (1), and n is a number of from 0 to 1,000.

Polyorganosiloxane (a1):

This polyorganosiloxane (a1) is chiefly composed of $R^1 SiX_3$ and $R^2 SiX_3$, and is obtained using as a starting material at least one of $SiX_4$, $R^1{}_2 SiX_2$, $R^1{}_3 SiX$, $R^2{}_2 SiX_2$ and $R^2{}_3 SiX$ [where $R^1$ and $R^2$ are as defined in respect of the formula (1); X represents in the present specification a hydrolyzable group as exemplified by a halogen atom or an —$OR^3$ group; and $R^3$ is as defined in respect of the formula (1)] in accord with the desired structure, and by hydrolysis and condensation with addition of a solvent and an alcohol ($R^3 OH$, where $R^3$ is as defined above), under acidic or alkaline conditions and using water in a quantity smaller than that of water in reaction equivalent weight for the hydrolyzable group X. This compound is known to those skilled in the art, as RO—Si-group-containing silicone resin.

The group represented by $R^1$ in the average compositional formula (1), is at least one group selected from the group consisting of a substituted or unsubstituted alkyl group and a substituted or unsubstituted aryl group. It may specifically include alkyl groups having 1 to 20 carbon atoms, such as a methyl group, an ethyl group, a n-propyl group, an i-propyl group, a n-butyl group and an i-butyl group; aryl groups having 6 to 20 carbon atoms, such as a phenyl group; and groups containing a substituent such as a trifluoropropyl group, a 3-aminopropyl group, a 3-glycidoxypropyl group or a 3-mercaptopropyl group. In view of availability, curability required when the polyorganosiloxane compound of the present invention is added to the silicone resin, and weatherability, a methyl group is particularly preferred.

Letter symbol a, which represents the number of $R^1$, is a number within the range of $0 \leq a \leq 1.5$. If $a > 1.5$, the curability required when the polyorganosiloxane compound is added to the silicone resin and the resultant coating film hardness may be insufficient. Also, letter symbols a, b and c are numbers that satisfy $0.01 \leq b \leq 1$, $0.5 \leq a+b \leq 1.8$, $0.01 \leq c \leq 2.5$ and $1 \leq a+b+c \leq 3$.

The group represented by $R^2$ is a group having an aliphatic unsaturated double bond, where at least one group must be present in the molecule in order to allow the polyorganosiloxane (a1) to react with the polyorganosiloxane (a2). As specific examples of this group having such an unsaturated double bond, it may include aliphatic groups such as a vinyl group, an allyl group, an isopropenyl group, a 1-butenyl group, a 2-butenyl group and a 3-butenyl group; alicyclic groups such as a 2-cyclohexenyl group, a 3-cyclohexenyl group, a 2-vinylcyclohexyl group, a 3-vinylcyclohexyl group and a 4-vinylcyclohexyl group; aromatic groups such as a 2-vinylphenyl group, a 3-vinylphenyl group, a 4-vinylphenyl group, a 2-allylphenyl group, a 3-allylphenyl group and a 4-allylphenyl group, and groups having a substituent such as a 3-allyloxypropyl group or a 3-methacryl- and/or 3-acryloxypropyl group. In view of availability, and reactivity with Si—H groups, a vinyl group is preferred.

Letter symbol b, which represents the number of $R^2$, is a number within the range of $0.01 \leq b \leq 1$. If $b < 0.01$, the reaction with Si—H groups does not proceed sufficiently. If $b > 1$, the curability required when the reaction product is added to the silicone resin and the resultant coating film hardness may be insufficient.

The a+b, the total of the organic groups $R^1$ and $R^2$, is a number within the range of $0.5 \leq a+b \leq 1.8$. If $a+b < 0.5$, the flexibility to be attained when the product polyorganosiloxane compound of the present invention is added to the silicone resin may be insufficient. If $a+b > 1.8$, the curability required when the polyorganosiloxane compound is added to the silicone resin and the resultant coating film hardness may be insufficient.

The group represented by $R^3$ is at least one member selected from the group consisting of a hydrogen atom and an alkyl group having 1 to 4 carbon atoms which may have an ether linkage. This is a group corresponding to the RO—Si group of the polyorganosiloxane compound, and is used in the curing with silicone resin when the polyorganosiloxane compound obtained is added to the silicone resin. This group may specifically include a hydrogen atom, a methyl group, an ethyl group, a n-propyl group, an i-propyl group, a n-butyl group, an i-butyl group and a Bu—O—$C_2H_4$ group. In view of availability, and curability required when the polyorganosiloxane compound of the present invention is added to the silicone resin, a methyl group or an ethyl group is preferred.

Letter symbol c, which represents the number of the group $OR^3$, is a number within the range of $0.01 \leq c \leq 2.5$. If $c < 0.01$, the curability required when the product polyorganosiloxane compound of the present invention is added to the silicone resin and the resultant coating film hardness may be insufficient. If $c > 2.5$, the flexibility to be attained when the reaction product is added to the silicone resin may be insufficient.

The a+b+c, the total of all functional groups on Si, is a number within the range of $1 \leq a+b+c \leq 3$. If $a+b+c < 1$, the polyorganosiloxane (a1) has so high a molecular weight as to tend to gel. If a+b+c>3, the polyorganosiloxane (a1) has so low a molecular weight as to have a poor compatibility when the polyorganosiloxane compound obtained is added to the silicone resin.

In order to make the polyorganosiloxane (a2) compatible with the silicone resin, the polyorganosiloxane (a1) must have at least some degree of polymerization, and may preferably have an average degree of polymerization (m) of from 2 to 1,000, and more preferably from 5 to 200. If m<2, a poor compatibility may result when the polyorganosiloxane compound obtained is added to the silicone resin. If m>1,000, it may be difficult to effect synthesis and also the polyorganosiloxane (a1) may come short of reactivity with the polyorganosiloxane (a2).

Polyorganosiloxane (a2):

The polyorganosiloxane (a2) having a specific structure is a polyorganosiloxane compound represented by the above general formula (2).

This polyorganosiloxane (a2) is a compound commonly called a both-terminal Si—H-group-containing silicone oil, and is known to those skilled in the art.

$R^1$ is as defined in respect of the average compositional formula (1), representing the polyorganosiloxane (a1) and is at least one group selected from the group consisting of a substituted or unsubstituted alkyl group and a substituted or unsubstituted aryl group. Of these, in view of availability, and weatherability or flexibility to be attained when the polyorganosiloxane compound of the present invention is added to the silicone resin, a methyl group is particularly preferred.

In order to improve the flexibility of the silicone resin, this polyorganosiloxane (a2) must also have some degree of polymerization. Accordingly, in the formula (2), n may preferably be from 0 to 1,000, and more preferably from 5 to 200. If n is more than 1,000, the polyorganosiloxane (a2) may come short of reactivity with the polyorganosiloxane (a1) and also a poor compatibility may result when the polyorganosiloxane compound obtained is added to the silicone resin.

Reaction of (a1) with (a2):

In the present invention, the polyorganosiloxane compound is obtained by utilizing the reaction of hydrosilylation of Si—H groups contained in both terminals of the polyorganosiloxane (a2) to aliphatic unsaturated double bonds contained in the polyorganosiloxane (a1). Thus, the polyorganosiloxane compound has a form in which the silicone resin structure of the polyorganosiloxane (a1) having RO—Si groups is bonded to each terminal of the silicone oil straight-chain structure of the polyorganosiloxane (a2).

In this hydrosilylation, a single metal such as Ni, Rh, Pd or Pt or a compound or composite thereof is usually used as a catalyst. In view of good catalytic activity, and also readiness to handle because of a catalyst of uniform system, often used are $H_2PtCl_6 \cdot 6H_2O$ and an olefin complex of Pt. Also, the catalyst may be used in an effective quantity, which may specifically be in the range of from 0.1 to 1,000 ppm in terms of the metallic element, based on the whole reaction system. These catalysts are expensive and may cause coloring, and hence may preferably be used in a minimum effective quantity necessary for the reaction.

There are no particular limitations on the temperature of this hydrosilylation. Usually, the reaction rate is regulated by heating. Also, in order to dissolve the silicone resin component polyorganosiloxane (a1) and the silicone oil component polyorganosiloxane (a2), having poor compatibility with each other, to make their reaction proceed smoothly, or in order to lower viscosity to make them easy to handle, a solvent such as hexane, pentane, toluene or xylene may be added.

In the present invention, the number of moles of unsaturated double bonds contained in the polyorganosiloxane (a1) and the number of moles of Si—H groups contained in the polyorganosiloxane (a2) may preferably be in a ratio of unsaturated double bond/Si—H group=1 to 10, and more preferably 1.2 to 5. This is because, since polymers react with each other, the presence of one-side functional groups in excess is more advantageous for making them react sufficiently, and also because any unreacted silicone oil component, i.e., unreacted polyorganosiloxane (a2), which may adversely affect the compatibility when the polyorganosiloxane compound obtained is added to the silicone resin can be made not to remain. Also, in the case when the polyorganosiloxane (a1) has two or more unsaturated double bonds in the molecule, this hydrosilylation may cause viscosity build-up and gelation. However, the use of the polyorganosiloxane (a1) in excess can prevent this gelation.

The polyorganosiloxane compound of the present invention may also be obtained by the following process.

Utilizing the reaction of hydrosilylation of Si—H groups to unsaturated groups, a polyorganosiloxane (a3) represented by the average compositional formula (3):

$$R^1{}_dH_eSi(OR^3)_fO_{(4-d-e-f)/2} \qquad (3)$$

wherein $R^1$ and $R^3$ are as defined in respect of the formula (1); and d, e and f are numbers that satisfy the following relation: $0 \leq d < 1.5$, $0.01 \leq e \leq 1$, $0.5 \leq d+e \leq 1.8$, $0.01 \leq f \leq 2.5$ and $1 \leq d+e+f \leq 3$; and having at least one Si—H group in the molecule; is allowed to react with a polyorganosiloxane (a4) represented by the general formula (4):

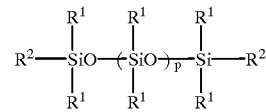

(4)

wherein $R^1$ and $R^2$ are as defined in respect of the formula (1), and p is a number of from 0 to 1,000.

This polyorganosiloxane (a3) is chiefly composed of $R^1SiX_3$ and $HSiX_3$, and is obtained using $SiX_4$, $R^1{}_2SiX_2$, $R^1{}_3SiX$, $H_2SiX_2$ and $H_3SiX$ [in these formulas, X is as defined previously) in accord with the desired structure, and by hydrolysis and condensation with addition of a solvent and an alcohol ($R^3OH$, where $R^3$ is as defined previously), under acidic or neutral conditions and using water in a quantity smaller than that of water in reaction equivalent weight for the hydrolyzable group X. This compound is known to those skilled in the art, as Si—H-group-containing silicone resin.

The group represented by $R^1$ is as described in respect of the average compositional formula (1), representing the polyorganosiloxane (a1), and is at least one group selected from the group consisting of a substituted or unsubstituted alkyl group having 1 to 20 carbon atoms and a substituted or unsubstituted aryl group having 6 to 20 carbon atoms. Specific examples thereof are also as already described previously, and a methyl group is particularly preferred.

Letter symbol d is a number within the range of $0 \leq d \leq 1.5$. If d>1.5, the curability required when the polyorganosiloxane compound is added to the silicone resin and the resultant coating film hardness may be insufficient.

Letter symbol e is also a number within the range of $0.01 \leq e \leq 1$ because the polyorganosiloxane (a3) must have at least one Si—H group in the molecule in order to react with the polyorganosiloxane (a4). If e<0.01, the reaction with Si—H groups does not proceed sufficiently. If e>1, the curability required when the reaction product is added to the silicone resin and the resultant coating film hardness may be insufficient.

The d+e, the total of the organic groups $R^1$ and hydrogen atoms, is a number within the range of $0.5 \leq d+e \leq 1.8$. If d+e<0.5, the flexibility to be attained when the product polyorganosiloxane compound of the present invention is added to the silicone resin may be insufficient. If d+e>1.8, the curability required when the polyorganosiloxane compound is added to the silicone resin and the resultant coating film hardness may be insufficient.

The group represented by $R^3$ is also as described in respect of the formula (1), representing the polyorganosiloxane (a1), and is at least one member selected from the group consisting of a hydrogen atom and an alkyl group having 1 to 4 carbon atoms which may have an ether linkage. This is a group corresponding to the $R^3O$—Si group of the polyorganosiloxane compound, and is used in the curing with silicone resin when the polyorganosiloxane compound obtained is added to the silicone resin. Specific examples thereof are also as already described previously, and, in view of the curability required when the polyorganosiloxane compound is added to the silicone resin, a methyl group or an ethyl group is preferred.

Letter symbol f is a number within the range of $0.01 \leq f \leq 2.5$. If f<0.01, the curability required when the product polyorganosiloxane compound of the present invention is added to the silicone resin and the resultant coating film hardness may be insufficient. If f>2.5, the flexibility to be attained when the reaction product is added to the silicone resin may be insufficient.

The d+e+f, the total of all functional groups on Si, is a number within the range of $1 \leq d+e+f \leq 3$. If d+e+f<1, the polyorganosiloxane (a3) has so high a molecular weight as to tend to gel. If d+e+f>3, the polyorganosiloxane (a3) has so low a molecular weight as to have a poor compatibility when the polyorganosiloxane compound obtained is added to the silicone resin.

In order to make the polyorganosiloxane (a4) compatible with the silicone resin, the polyorganosiloxane (a3) must have at least some degree of polymerization, and may preferably have an average degree of polymerization (q) of from 2 to 1,000, and more preferably from 5 to 200. If q<2, a poor compatibility may result when the polyorganosiloxane compound obtained is added to the silicone resin. If q>1,000, it may be difficult to effect synthesis and also the polyorganosiloxane (a3) may come short of reactivity with the polyorganosiloxane (a4).

Polyorganosiloxane (a4):

The polyorganosiloxane (a4) is a polyorganosiloxane represented by the above general formula (4).

This polyorganosiloxane (a4) is a compound commonly called a silicone oil having unsaturated double bonds at both terminals, and is known to those skilled in the art.

$R^1$ is as defined in respect of the formula (1), and is at least one group selected from the group consisting of a substituted or unsubstituted alkyl group and a substituted or unsubstituted aryl group. Specific examples thereof are as exemplified in respect of the formula (1). Of these, in view of availability, and weatherability or flexibility to be attained when the polyorganosiloxane compound of the present invention is added to the silicone resin, a methyl group is particularly preferred.

In order to improve the flexibility of the silicone resin, this polyorganosiloxane (a4) must also have some degree of polymerization. Accordingly, in the formula (4), p may preferably be from 0 to 1,000, and more preferably from 5 to 200. If p>1,000, the polyorganosiloxane (a4) may come short of reactivity with the polyorganosiloxane (a3) and also a poor compatibility may result when the polyorganosiloxane compound obtained is added to the silicone resin.

The organic groups $R^2$ present at the both terminals of the molecule of the polyorganosiloxane (a4) is as defined in respect of the formula (1), and is a group having an aliphatic unsaturated double bond. Specific examples of this group having such an unsaturated double bond are also as exemplified in respect of the formula (1), and, in view of availability, and reactivity with Si—H groups, a vinyl group is preferred.

In the present invention, the polyorganosiloxane compound is obtained by utilizing the reaction of hydrosilylation of Si—H groups contained in the polyorganosiloxane (a3) to aliphatic unsaturated double bonds present at both terminals of the polyorganosiloxane (a4). Thus, the polyorganosiloxane compound has a form in which the silicone resin structure of the polyorganosiloxane (a3) having RO—Si groups is bonded to each terminal of the silicone oil straight-chain structure of the polyorganosiloxane (a4).

In this hydrosilylation, too, the same catalyst as the one described in respect of the polyorganosiloxane compound obtained by the first process is used, and also there are no particular limitations on the reaction temperature and the addition of a solvent.

In the present invention, the number of moles of Si—H groups contained in the polyorganosiloxane (a3) and the number of moles of unsaturated double bonds contained in the polyorganosiloxane (a4) may preferably be in a ratio of Si—H group/unsaturated double bond=1 to 10, and more preferably 1.2 to 5. This is because, since polymers react with each other, the presence of one-side functional groups in excess is more advantageous for making them react sufficiently, and also because any unreacted silicone oil component, i.e., unreacted polyorganosiloxane (a4), which may adversely affect the compatibility when the polyorganosiloxane compound obtained is added to the silicone resin can be made not to remain. Also, in the case when the polyorganosiloxane (a3) has two or more Si—H groups in the molecule, this hydrosilylation may cause viscosity build-up and gelation. However, the use of the polyorganosiloxane (a3) in excess can prevent this gelation.

In the polyorganosiloxane compound according to the present invention, the number (M) of Si atoms of the silicone resin components, i.e., Si atoms due to the polyorganosiloxane (a1) or (a3), and the number (N) of Si atoms of the silicone oil component, i.e., Si atoms due to the polyorganosiloxane (a2) or (a4) may preferably be in a ratio of M/N of from 0.1 to 50, and more preferably from 0.3 to 20. If M/N<0.1, the proportion of the silicone resin component is so small that a poor compatibility may result when the polyorganosiloxane compound is added to the silicone resin. Too large a proportion of M/N makes the proportion of the silicone oil component too small to expect any improvement in flexibility when the compound is added to the silicone resin.

In the polyorganosiloxane compound of the present invention, the Si atoms may preferably be in a number of from 5 to 2,000 atoms, and particularly from 10 to 400 atoms.

The polyorganosiloxane compound of the present invention may preferably be a compound in which at least 80 mole % of substituents other than alkoxyl groups and silanol groups contained therein is held by methyl groups. Such a compound is preferred in view of the curability required when the polyorganosiloxane compound is added to the silicone resin and the resultant coating film hardness, flexibility and weatherability.

Coating Composition

The coating composition of the present invention comprises:

(α) from 0.1 part by weight to 100 parts by weight of the polyorganosiloxane compound described above;

(β) from 99.9 parts by weight to 0 part by weight of a silane compound and/or silicone resin containing an $R^3O$—Si group ($R^3$ is as defined previously);

provided that the total of components (α) and (β) comes to 100 parts by weight; and (γ) from 0.01 part by weight to 50 parts by weight of a curing catalyst, based on 100 parts by weight of the total of the components (α) and (β).

The polyorganosiloxane compound used as component (α) is a component which imparts flexibility to a cured product of this composition. It may be added in an amount of from 0.1 to 100 parts by weight, preferably from 1 to 70 parts by weight, and particularly preferably from 2 to 50 parts by weight. If it is less than 0.1 part by weight, the improvement in flexibility may be insufficient.

The component-(β) silane compound or silicone resin containing an $R^3O$—Si group, or a mixture of these, is a component that forms a skeletal portion of the coating composition. It is added in an amount of from 99.9 to 0 part by weight, preferably from 99 to 30 parts by weight, and particularly preferably from 98 to 50 parts by weight. If it is more than 99.9 parts by weight, the component-(α) polyorganosiloxane compound is in too small a proportion to expect any improvement in flexibility.

The component-(β) silane compound containing an $R^3O$—Si group is a component that forms the silicone resin upon hydrolysis and condensation when the coating composition is cured. For example, it may include $R^4Si(OR^3)_3$, $Si(OR^3)_4$, $R^4{}_2Si(OR^3)_2$ and $R^4{}_3SiOR^3$. Usually, it is composed chiefly of $R^4Si(OR^3)_3$ and optionally contains at least one of $Si(OR^3)_4$, $R^4{}_2Si(OR^3)_2$ and $R^4{}_3SiOR^3$ in accord with the desired molecular structure.

In the silane compounds exemplified above, the organic group $R^4$ is at least one member selected from the group consisting of a substituted or unsubstituted alkyl group having 1 to 20 carbon atoms, a substituted or unsubstituted aryl group having 6 to 20 carbon atoms, a hydrogen atom and a group containing an aliphatic unsaturated double bond. It may specifically include alkyl groups such as a methyl group, an ethyl group, a n-propyl group, an i-propyl group, a n-butyl group, an i-butyl group, a n-decyl group and a n-octadecyl group; aryl groups such as a phenyl group; groups containing a substituent such as a trifluoropropyl group, a perfluorooctylethyl group, a 3-aminopropyl group, a 3-glycidoxypropyl group or a 3-mercaptopropyl group; a hydrogen atom; aliphatic unsaturated groups such as a vinyl group, an allyl group, an isopropenyl group, a 1-butenyl group, a 2-butenyl group and a 3-butenyl group; alicyclic groups such as a 2-cyclohexenyl group, a 3-cyclohexenyl group, a 2-vinylcyclohexyl group, a 3-vinylcyclohexyl group and a 4-vinylcyclohexyl group; aromatic groups such as a 2-vinylphenyl group, a 3-vinylphenyl group, a 4-vinylphenyl group, a 2-allylphenyl group, a 3-allylphenyl group and a 4-allylphenyl group; and groups having a substituent such as a 3-allyloxypropyl group, a 3-methacryloxypropyl group or a polyoxyethylene-containing group. In view of availability, and good curability and weatherability of the coating composition, a methyl group is particularly preferred. Incidentally, different from the polyorganosiloxanes (a1) and (a3), the organic group $R^4$ need not necessarily contain the aliphatic unsaturated double bond or Si—H group.

The $R^3$ in the above silane compound is as defined in respect of the average compositional formula (1), and is at least one member selected from the group consisting of a hydrogen atom and a substituted or unsubstituted alkyl group having 1 to 4 carbon atoms which may have an ether linkage. Specific examples thereof are also as described previously, and, in view of availability, and curability of the coating composition, a methyl group and an ethyl group are preferred.

As examples of such a silane compound, it may specifically include $Si(OMe)_4$, $MeSi(OMe)_3$, $Me_2Si(OMe)_2$, $Me_3SiOMe$, $Si(OEt)_4$, $MeSi(OEt)_3$, $Me_2Si(OEt)_2$, $Me_3SiOEt$, $EtSi(OMe)_3$, $Et_2Si(OMe)_2$, $Et_3SiOMe$, $EtSi(OEt)_3$, $Et_2Si(OEt)_2$, $Et_3SiOEt$, n-$PrSi(OMe)_3$, (n-$Pr)_2Si(OMe)_2$, (n-$Pr)_3SiOMe$, n-$PrSi(OEt)_3$, (n-$Pr)_2Si(OEt)_2$, (n-$Pr)_3SiOEt$, $PhSi(OMe)_3$, $Ph_2Si(OMe)_2$, $Ph_3SiOMe$, $PhSi(OEt)_3$, $Ph_2Si(OEt)_2$ and $Ph_3SiOEt$, (in these formulas, Me represents a methyl group, Et an ethyl group, n-Pr an n-propyl group and Ph a phenyl group).

The silicone resin containing an $R^3O$—Si group is a compound represented by the average compositional formula (5):

$$R^4{}_gSi(OR^3)_hO_{(4-g-h)/2} \qquad (5)$$

wherein $R^3$ and $R^4$ are as defined previously, g is a number preferably within the range of $0.5 \leq g \leq 2.0$, and h is a number preferably within the range of $0.01 \leq h \leq 2.5$; and is a compound known to those skilled in the art, as RO—Si-containing silicone resin.

With regard to the organic groups $R^3$ and $R^4$, the $R^4$ may preferably be a methyl group and $R^3$ may preferably be a methyl group or an ethyl group, in view of good curability of the coating composition and good weatherability of cured coatings obtained. Incidentally, different from the polyorganosiloxanes (a1) and (a3), these organic groups need not necessarily contain the unsaturated-double-bond-containing group or Si—H group.

The range of the number represented by g may preferably be, but not particularly limited to, $0.5 \leq g \leq 2.0$. If g is too small, the coating tends to have an insufficient flexibility. If g is too large, the composition may have an insufficient curability, and the resultant coating film an insufficient hardness. The range of the number represented by h may also preferably be, but not particularly limited to, $0.01 \leq h \leq 2.5$. If it is too small, the composition may have an insufficient curability, and the resultant coating film an insufficient hardness. If it is too large, the resultant coating film may have an insufficient flexibility. There are no particular limitations on the average degree of polymerization (r) of this silicone resin, which may usually be from 2 to 1,000 because a silicone resin with r>1,000 may be synthesized with difficulty.

In order to change the viscosity of the coating composition to improve workability or to control the curability of the composition, the hardness and flexibility of the resultant coating film, these silane compound resin containing an $R^3O$—Si and silicone resin containing an $R^3O$—Si group may also be used in the form of a mixture.

The curing catalyst (γ) is a component which makes the coating composition cure which is obtained by hydrolysis and condensation with water content in air, of $R^3O$—Si groups contained in the component-(α) polyorganosiloxane compound and the component-(β) silane compound and/or silicone resin containing an $R^3O$—Si group. It is added in an amount of from 0.01 to 50 parts by weight, and more preferably from 0.05 to 10 parts by weight, based on 100 parts by weight of the total of the components (α) and (β). If it is less than 0.01 part by weight, the composition may have a low curability. Even if it is more than 50 parts by weight, no change can be seen in the curability of the coating composition, resulting in waste or conversely a low curability.

Such a curing catalyst (γ) may specifically include acid catalysts such as HCl, $H_2SO_4$, $H_3PO_4$ and $CH_3SO_3H$; alkali metal compounds such as NaOH, KOH, $CH_3ONa$, $CH_3OK$, $CH_3COONa$ and $CH_3COOK$; $NH_3$; amine compounds such as $EtNH_2$, $Et_2NH$, $Et_3N$, DBU and $H_2NC_3H_6Si(OMe)_3$; and Al-based, Ti-based or Sn-based metal catalysts such as $Al(acac)_3$, $Al(O-i-Pr)_3$, $Al(ClO_4)_3$, $Ti(O-i-Pr)_4$, $Ti(O-i-Bu)_4$, $Bu_2Sn(acac)_2$ and $Bu_2Sn(C_7H_{15}COO)_2$.

The coating composition of the present invention is coated on substrates of various types by known methods such as spraying and brushing, and the curing reaction starts upon its contact with the water content in air. Here, moisture content in air may be enough for the water content. The composition may also positively be brought into contact with water. The curing of this coating composition proceeds well even under conditions of normal temperature, and may also be made by heat treatment at 300° C. or below. Especially even when the composition is cured at room temperature as in in situ application, the coating composition of the present invention has so good a curing rate that it becomes not sticky in few hours, promising a good operability. Also, under conditions such that the moisture in air alone may come short of water content as in the case of heat curing, a silicone resin having not only $R^3O$—Si groups but also Si—OH groups may be used as the component (β), whereby the composition can sufficiently be cured.

When the coating composition of the present invention is used, various additives such as an adhesion improver, an inorganic or organic ultraviolet-light absorber, a storage stability improver, a plasticizer, a filler, an anti-aging agent and a pigment may also be added according to purposes for which the composition is used. Incidentally, the coating composition of the present invention is basically a solvent-free type coating material which is combustible and does not contain any organic solvent harmful to the human body. However, taking account of its uses and operability, a solvent may also be added.

In addition, as the substrates, usable are various metallic materials and workpieces, wood, building stone, slates, mortars, glasses, ceramics, plastic products, tiles, organic resin-coated products and so forth, extending over a wide range of uses.

Usually, the silicone oil component, i.e., the polyorganosiloxane (a2) or (a4) in the case of the present invention is not compatible with the silicone resin (β), and hence any products which are stable and uniform as coating composition can not be obtained. However, in the polyorganosiloxane compound of the present invention, the silicone resin component polyorganosiloxane (a1) or (a3) and the silicone oil component polyorganosiloxane (a2) or (a4) are combined by hydrosilylation, and hence the poor compatibility with the part of the silicone resin component polyorganosiloxane (a1) or (a3) can be avoided. Thus, the cured product of the composition is endowed with flexibility on account of the soft silicone oil structure attributable to the silicone oil component, silicone compound (a2) or (a4). Also, the polyorganosiloxane compound has $R^3O$—Si groups due to the silicone resin component polyorganosiloxane (a1) or (a3), and participates positively to the curing of this coating composition. Hence, it by no means adversely affects the curing rate and coating film hardness that are characteristic of this coating composition.

EXAMPLES

The polyorganosiloxane compound of the present invention and the coating composition containing it are described below in greater detail by giving Examples. The present invention is by no means limited by these Examples.

In the following description, "part(s)" is meant to be "part(s) by weight". Weight-average molecular weight and silicone composition are determined in the following way.

Weight-average molecular weight:

Weight-average molecular weight (hereinafter "Mw") is the value calculated as polystyrene, measured with a GPC (gel permeation chromatography) apparatus manufactured by Toso Co., Ltd., using toluene as a solvent and using an RI (refractive index) detector as a detector.

Silicone composition:

The composition of each product is measured with a 300 MHz NMR measuring instrument manufactured by Nippon Denshi K. K., and calculated from $^1$H-NMR and $^{29}$SiNMR.

Preparation Example 1

In 2-liter three-necked flask, 1,158 g of $MeSi(OMe)_3$, and 198 g of $ViMeSi(OMe)_2$ were added, and 188 g of 0.05N hydrochloric acid water was dropwise added thereto with stirring to carry out hydrolysis and condensation at 68° C. for 2 hours. The resultant reaction mixture was heated to 120° C. to remove the by-produced methanol, followed by filtration to obtain 850 g of a colorless transparent liquid, silicone resin component (R-1). (Here, Me represents a methyl group, and Vi a vinyl group.)

The silicone resin component (R-1) thus obtained had average composition of $Me_{1.00}Vi_{0.14}SiO_{1.13}(OMe)_{0.61}$, and had an Mw of 1,740 and an average degree of polymerization m of 21.

Preparation Example 2

In 500-mL three-necked flask, 259 g of the silicone resin component (R-1), 125 g of both-terminal Si—H group-terminated dimethylsiloxane oil $H-[Me_2SiO]_{19}-Me_2Si-H$ as a silicone oil component and 1.5 g of a Pt catalyst CAT-PL-50T (available from Shin-Etsu Chemical Co., Ltd.) were added to carry out hydrosilylation at 80° C. for 8 hours, and IR analysis was conducted to make sure of the disappearance of Si—H groups. The resultant reaction mixture was subjected to stripping under reduced pressure at 120° C. and 10 mmHg for 2 hours, followed by filtration to obtain 360 g of a colorless transparent liquid, polyorganosiloxane compound (A1).

Preparation Example 3

In 500-mL three-necked flask, 198 g of the silicone resin component (R-1), 200 g of both-terminal Si—H group-terminated dimethylsiloxane oil H—[Me$_2$SiO]$_{40}$—Me$_2$Si—H as a silicone oil component and 1.5 g of a Pt catalyst CAT-PL-50T (available from Shin-Etsu Chemical Co., Ltd.) were added to carry out hydrosilylation at 80° C. for 8 hours, and IR analysis was conducted to make sure of the disappearance of Si—H groups. The resultant reaction mixture was subjected to stripping under reduced pressure at 120° C. and 10 mmHg for 2 hours, followed by filtration to obtain 380 g of a colorless transparent liquid, polyorganosiloxane compound (A2).

Preparation Example 4

In 2-liter three-necked flask, 1,090 g of MeSi(OMe)$_3$, and 264 g of ViMeSi(OMe)$_2$ were added, and 151 g of 0.05N hydrochloric acid water was dropwise added thereto with stirring to carry out hydrolysis and condensation at 68° C. for 2 hours. The resultant reaction mixture was heated to 120° C. to remove by-produced methanol, followed by filtration to obtain 920 g of a colorless transparent liquid, silicone resin component (R-2).

The silicone resin component (R-2) thus obtained had average composition of Me$_{1.00}$Vi$_{0.19}$SiO$_{0.73}$(OMe)$_{1.36}$, and had an Mw of 550 and an average degree of polymerization m of 5.4

Preparation Example 5

In 500-mL three-necked flask, 388 g of the silicone resin component (R-2), 100 g of both-terminal Si—H group dimethylsiloxane oil H—[Me$_2$SiO]$_{4.9}$—Me$_2$Si—H as a silicone oil component and 1.5 g of a Pt catalyst CAT-PL-50T (available from Shin-Etsu Chemical Co., Ltd.) were added to carry out hydrosilylation at 80° C. for 8 hours, and IR analysis was conducted to make sure of the disappearance of Si—H groups. The resultant reaction mixture was subjected to stripping under reduced pressure at 120° C. and 10 mmHg for 2 hours, followed by filtration to obtain 468 g of a colorless transparent liquid, polyorganosiloxane compound (A3).

Preparation Example 6

In 500-mL three-necked flask, 78 g of the silicone resin component (R-2), 300 g of both-terminal Si—H group-terminated dimethylsiloxane oil H—[Me$_2$SiO]$_{98}$—Me$_2$Si—H as a silicone oil component and 1.5 g of a Pt catalyst CAT-PL-50T (available from Shin-Etsu Chemical Co., Ltd.) were added to carry out hydrosilylation at 80° C. for 8 hours, and IR analysis was conducted to make sure of the disappearance of Si—H groups. The resultant reaction mixture was subjected to stripping under reduced pressure at 120° C. and 10 mmHg for 2 hours, followed by filtration to obtain 355 g of a colorless transparent liquid, polyorganosiloxane compound (A4).

Preparation Example 7

In 2-liter three-necked flask, 1,342 g of MeSi(OMe)$_3$, 20 g of ViMeSi(OMe)$_2$ were added, and 225 g of 0.05N hydrochloric acid water was dropwise added thereto with stirring to carry out hydrolysis and condensation at 68° C. for 2 hours. The resultant reaction mixture was heated to 120° C. to remove by-produced methanol, followed by filtration to obtain 743 g of a colorless transparent liquid, silicone resin component (R-3).

The silicone resin component (R-3) thus obtained had average composition of Me$_{1.00}$Vi$_{0.01}$SiO$_{1.27}$(OMe)$_{0.45}$, and had an Mw of 8,200 and an average degree of polymerization m of 106.

Preparation Example 8

In 500-mL three-necked flask, 282 g of the silicone resin component (R-3), 100 g of both-terminal Si—H group-terminated dimethylsiloxane oil H—[Me$_2$SiO]$_{98}$—Me$_2$Si—H as a silicone oil component and 1.5 g of a Pt catalyst CAT-PL-50T (available from Shin-Etsu Chemical Co., Ltd.) were added to carry out hydrosilylation at 80° C. for 8 hours, and IR analysis was conducted to make sure of the disappearance of Si—H groups. The resultant reaction mixture was subjected to stripping under reduced pressure at 120° C. and 10 mmHg for 2 hours, followed by filtration to obtain 352 g of a colorless transparent liquid, polyorganosiloxane compound (A5).

Preparation Example 9

In 500-mL three-necked flask, 47 g of ViSi(OMe)$_3$, 400 g of both-terminal Si—H group dimethylsiloxane oil H—[Me$_2$SiO]$_{40}$—Me$_2$Si—H as a silicone oil component and 1.5 g of a Pt catalyst CAT-PL-50T (available from Shin-Etsu Chemical Co., Ltd.) were added to carry out hydrosilylation at 80° C. for 4 hours, and IR analysis was conducted to make sure of the disappearance of Si—H groups. The resultant reaction mixture was subjected to stripping under reduced pressure at 120° C. and 10 mmHg for 2 hours, followed by filtration to obtain 370 g of a colorless transparent liquid, polyorganosiloxane compound (A'2) (MeO)$_3$Si—C$_2$H$_4$—[Me$_2$SiO]$_{40}$—Me$_2$Si—C$_2$H$_4$—Si(OMe)$_3$.

Preparation Example 10

In 2-liter three-necked flask, 954 g of MeSi(OMe)$_3$, 361 g of Me$_2$Si(OMe)$_2$ were added, and 190 g of 0.05N hydrochloric acid water was dropwise added thereto with stirring to carry out hydrolysis and condensation at 68° C. for 2 hours. The resultant reaction mixture was heated to 120° C. to remove methanol as a by-product, followed by filtration to obtain 790 g of a colorless transparent liquid, silicone resin (α').

The silicone resin (β') thus obtained had average composition of Me$_{1.28}$SiO$_{1.07}$(OMe)$_{0.58}$, and had an Mw of 1,900 and an average degree of polymerization m of 23, where dimethylsiloxane units (D units) stood incorporated in the silicone resin component at random.

Preparation Example 11

In 2-liter three-necked flask, 1,905 g of MeSi(OMe)$_3$ was added, and 180 g of 0.05N hydrochloric acid water was dropwise added thereto with stirring to carry out hydrolysis and condensation at 68° C. for 2 hours. The resultant reaction mixture was heated to 120° C. to remove by-produced methanol, followed by filtration to obtain 875 g of a colorless transparent liquid, silicone resin (β1).

The silicone resin (β1) thus obtained had average composition of Me$_{1.00}$SiO$_{1.03}$(OMe)$_{0.95}$, and had an Mw of 1,500 and an average degree of polymerization m of 17.

Example 1

90 parts of the silicone resin (β1) was mixed with 10 parts of the polyorganosiloxane compound (A1) and 2 parts of Ti(O—i—Bu)$_4$ with stirring to obtain a composition. The composition thus obtained was coated on the surface of a surface-cleaned polished steel sheet so as to be in a layer thickness of about 60 μm after curing, and the coating formed was left at room temperature for a week to effect curing.

The following evaluation was made on the composition and the cured coating. The results are shown in Table 1.

Appearance of composition solution:

The solution of the composition obtained was observed with the naked eye, and was evaluated as "good" when it was colorless and transparent, and as "milkiness" when it stood milky-white.

Appearance of coating film:

The coating film obtained was observed with the naked eye, and was evaluated as "good" when it was colorless and transparent, and as "milkiness" when it stood milky-white.

Drying characteristics:

A test piece obtained by coating the composition on a polished steel sheet was left at room temperature, and the time by which the coating surface became not sticky to the touch even when fingered with force was examined.

Coating film hardness:

A test piece on which a cured coating had been formed was tested by the pencil scratch test prescribed in JIS K-5400 to measure its coating film hardness.

Flexibility:

A test piece on which a cured coating had been formed was bent over a round rod of 10 mm in shaft diameter by means of the bending test machine prescribed in JIS K-5400. An instance where no change was seen on the coating film surface was evaluated as "○"; and an instance where cracking or peeling was seen, as "X".

Examples 2 to 7 & Comparative Examples 1 to 6

In each Example and Comparative Example, a composition was prepared in the formulation shown in Table 1 or 2, and was cured in the same manner as in Example 1. Evaluation was made on the composition and the cured coating in the same manner as in Example 1.

Silicone oil (A'1) used in Comparative Examples 2 and 3 has a structure represented by Me—[Me$_2$SiO]$_{40}$SiMe$_3$.

Evaluation results:

As can be seen from the results of Examples 1 to 7, the polyorganosiloxane compounds (A1 to A5) used as the component (α) in the present invention are perfectly compatible with the silicone resin (β1) although they have silicone oil chain structure. As the result, both the composition solutions and the cured coatings were colorless and transparent, and coating films having homogeneous structure were obtained; the coating films having superior hardness and flexibility.

On the other hand, in the case when only the silicone resin (β1) was contained and the component (α) according to the present invention was not contained (Comparative Example 1), the flexibility was very poor. Also, in the case when silicone oils having no silicone resin structure (degree of polymerization of resin moiety: m<2) were used in place of the component (α) according to the present invention (Comparative Examples 2 to 5), these silicone oils were not compatible with silicone resin (β1). Hence, the composition solutions became milky-white, and were not able to be coated because of repellency or, even if they were able to be coated, coating films were milky-white and also had a low coating film hardness because of faulty curing.

The polyorganosiloxane compound of the present invention can impart flexibility to the silicone resin having such poor flexibility, without little lowering the drying characteristics and coating film hardness.

In Comparative Example 6, in which the D units were incorporated in the silicone resin not in chain structure but at random, the coating film had a good appearance, but had low drying characteristics and low coating film hardness. Moreover, any improvement in flexibility was achievable.

TABLE 1

| Evaluation: | Example 1 | Example 2 | Example 3 | Example 4 | Example 5 | Example 6 | Example 7 |
|---|---|---|---|---|---|---|---|
| Component-(β) silicone resin β1: (parts) | 90 | 70 | 90 | 70 | 70 | 70 | 70 |
| Component-(α) polyorganosiloxane compound: (parts) | A1 10 | A1 30 | A2 10 | A2 30 | A3 30 | A4 30 | A5 30 |
| Component-(γ) Ti(O-i-Bu)$_4$: (parts) | 2 | 2 | 2 | 2 | 2 | 2 | 2 |
| Appearance of composition solution: | good | good | good | good | good | good | good |
| Degree of polymerization (m) of resin moiety in component (α) | 21 | 21 | 21 | 21 | 5.4 | 5.4 | 106 |
| Degree of polymerization (n) of oil moiety in component (α): | 20 | 20 | 41 | 41 | 4.9 | 98 | 98 |
| Appearance of | good | good | good | good | good | good | good |

TABLE 1-continued

| Evaluation: | Example 1 | Example 2 | Example 3 | Example 4 | Example 5 | Example 6 | Example 7 |
|---|---|---|---|---|---|---|---|
| coating film: | | | | | | | |
| Drying characteristics: (hours) | 1.5 | 1.5 | 1.5 | 1.5 | 1.5 | 1.5 | 2 |
| Coating film hardness: | H | F | H | F | F | F | F |
| Flexibility: | ○ | ○ | ○ | ○ | ○ | ○ | ○ |

TABLE 2

| Evaluation: | Comparative Example 1 | Comparative Example 2 | Comparative Example 3 | Comparative Example 4 | Comparative Example 5 | Comparative Example 6 |
|---|---|---|---|---|---|---|
| Silicone resin β1: (parts) | 100 | 90 | 70 | 90 | 70 | Resin β' 100 |
| Organosiloxane: (parts) | 0 | Oil A'1 10 | Oil A'1 30 | A'2 10 | A'2 30 | 0 |
| Ti(O-i-Bu)$_4$: (parts) | 2 | 2 | 2 | 2 | 2 | 2 |
| Appearance of composition solution: | good | milkiness | milkiness | milkiness | milkiness | good |
| Degree of polymerization (m) of resin moiety | — | 0 | 0 | 1 | 1 | — |
| Degree of polymerization (n) of oil moiety | — | 41 | 41 | 41 | 41 | — |
| Appearance of coating film: | good | uncoatable | uncoatable | milkiness | milkiness | good |
| Drying characteristics: (hours) | 1.5 | — | — | 1.5 | 1.5 | 24 |
| Coating film hardness: | H | — | — | 6B or below | 6B or below | B |
| Flexibility: | X | — | — | ○ | ○ | X |

As described above, the polyorganosiloxane compound according to the present invention has a novel structure which comprises the structure due to silicone oil and the structure due to silicone resin in the molecule.

The coating composition of the present invention which contains these polyorganosiloxane compound and silicone resin as essential components can provide a remarkably superior flexibility while maintaining the good properties inherent in silicone resins, such as curability, surface hardness and weatherability.

What is claimed is:

1. A polyorganosiloxane compound which contains in the molecule a silicone oil structure and a silicone resin structure having at least one alkoxyl group and is compatible with a silicone resin, said polyorganosiloxane being obtained by allowing the following polyorganosiloxane (a1):

(a1) a polyorganosiloxane represented by the average compositional formula (1):

$$R^1{}_a R^2{}_b Si(OR^3)_c O_{(4-a-b-c)/2} \quad (1)$$

wherein $R^1$ is at least one member selected from the group consisting of a substituted or unsubstituted alkyl group and a substituted or unsubstituted aryl group; $R^2$ is a group containing an aliphatic unsaturated double bond; $R^3$ is an alkyl group having 1 to 4 carbon atoms which may have an ether linkage; and a, b and c are numbers that satisfy the following relation: $0 \leq a < 1.5$, $0.01 \leq b \leq 1$, $0.5 \leq a+b \leq 1.8$, $0.01 \leq c \leq 2.5$ and $1 \leq a+b+c \leq 3$; and having at least one aliphatic unsaturated double bond in the molecule, to react with the following polyorganosiloxane (a2):

(a2) a polyorganosiloxane represented by the general formula (2):

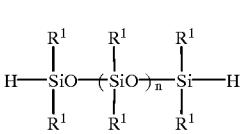

wherein $R^1$ is as defined in the above formula (1), and n is a number of from 0 to 1,000, in the presence of a hydrosilylation catalyst.

2. The polyorganosiloxane compound according to claim 1, wherein the number N of silicon atoms contained in the silicone oil structure and the number M of silicon atoms contained in the silicone resin structure are in a proportion M/N of from 0.1 to 50.

3. The polyorganosiloxane compound according to claim 1, wherein at least 80 mole % of substituents other than alkoxyl groups present in the polyorganosiloxane compound are methyl groups.

4. The polyorganosiloxane compound according to claim 1, wherein the alkoxyl group are methoxy groups.

5. The polyorganosiloxane compound according to claim 1, wherein $R^2$ is a vinyl group and $R^3$ is methyl.

6. A coating composition comprising:

(α) from 1 part weight to 70 parts by weight of the polyorganosiloxane compound according to claim 1;

(β) a silicone resin containing an $R^3O$—Si group where $R^3$ is an alkyl group having 1 to 4 carbon atoms which may have an ether linkage; and optionally a silane compound containing an $R^3O$—Si group where $R^3$ is as defined above, said silicone resin and said silane compound being present in a total amount of from 99 parts by weight to 30 parts by weight;

provided that the total of components (α) and (β) is 100 parts by weight; and (γ) from 0.01 part by weight to 50 parts by weight of a curing catalyst, based on 100 parts by weight of the total of the components (α) and (β).

7. The coating composition according to claim 6, wherein said curing catalyst (γ) is selected from the group consisting of an acid catalyst, an alkali metal compound, $NH_3$, an amine compound, and an Al-based, Ti-based and Sn-based metal catalysts.

8. A cured product obtained by curing the coating composition according to claim 6.

9. An article comprising a substrate and formed thereon a cured coating of the coating composition according to claim 6.

10. The coating composition according to claim 6, wherein $R^2$ is a vinyl group and $R^3$ is methyl.

11. The coating composition according to claim 6, wherein said curing catalyst (γ) is selected from the group consisting of an acid catalyst, an alkali metal compound, $NH_3$, an amine compound, and an Al-based, Ti-based and Sn-based metal catalysts.

12. A cured product obtained by curing the coating composition according to claim 6.

13. An article comprising a substrate and formed thereon a cured coating of the coating composition according to claim 6.

* * * * *